Patented June 10, 1924.

1,497,252

UNITED STATES PATENT OFFICE.

EUGENE THEIMER, OF NEWARK, NEW JERSEY, ASSIGNOR, BY MESNE ASSIGNMENTS, TO ROY F. STEWARD, OF WASHINGTON, DISTRICT OF COLUMBIA.

METHOD OF PREPARING METHYL PARAMINOPHENOL AND COMPOUNDS THEREOF.

No Drawing.   Application filed June 14, 1919.   Serial No. 304,271.

*To all whom it may concern:*

Be it known that I, EUGENE THEIMER, a citizen of the United States, residing at Newark, in the county of Essex and State of New Jersey, have invented certain new and useful Improvements in Methods of Preparing Methyl Paraminophenol and Compounds Thereof; and I do hereby declare the following to be a full, clear, and exact description of the invention, such as will enable others skilled in the art to which it appertains to make and use the same.

This invention relates to methods of preparing methylparaminophenol and compounds thereof, and more particularly to the manufacture of the sulfuric acid compound of methylparaminophenol.

Paraminophenol and certain derivatives thereof have long been known to be useful in varying degree as photographic developers. For many years a developer commercially known as metol, and believed to be methylparaminophenol sulfate, has been on the market and has been generally regarded as the most efficient and satisfactory developer available. Metol has heretofore been manufactured abroad and the details of its preparation have been kept secret. There have been various attempts to prepare it according to different methods, but so far as I am aware these attempts have been unsuccessful, either because the resulting product was found to be inferior to genuine metol or because the proposed methods were unworkable in practice.

According to the present invention, methylparaminophenol, or compounds thereof, and particularly its compound with sulfuric acid, commonly known as methylparaminophenol sulfate, can be prepared in a highly efficient and comparatively simple manner by subjecting a compound of the general type of methyl phenacetin (methyl acetphenetidin), for example, to what may be termed a saponifying treatment, that is, to treatment whereby the acetyl and ethyl groups are split off, with production of methylparaminophenol or a compound thereof. Moreover, the product obtained is not only equal in all respects to the product heretofore familiar to the trade as genuine metol, but has been found in actual use to be distinctly superior thereto in effectiveness. Similarly methyl acetylanisidin, methyl formylphenetidin or methyl formylanisidin may be employed instead of methyl phenacetin. All these compounds have the type formula

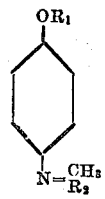

where $R_1$ is an alkyl group and $R_2$ is an acidyl group. They may be prepared from the parent compounds, viz, phenacetin, acetylanisidin, formylphenetidin and formylanisidin, by treatment of said parent compounds with metallic sodium, and a methyl halid, such as methyl bromid or iodid, successively.

For the purposes of the present invention, methyl phenacetin is at present considered to offer special advantages as a starting material; and in further explaining the principles of the invention hereinafter, a procedure involving the use of methyl phenacetin will therefore be described in detail for the sake of a concrete example illustrating what I now believe to be the best mode of practicing the invention; but it is to be understood that such description is not to be construed as limiting the invention in its broader aspects to the use of methyl phenacetin or to the specific details of procedure set forth.

Assuming for purposes of illustration, therefore, that methyl phenacetin constitutes the starting material, it is subjected to the action of a suitable reagent or suitable reagents to split off the ethyl and the acetyl groups, with production of methyl paraminophenol or, as is more usually the case, a compound of methylparaminophenol such as the compound with hydrobromic acid for example. This treatment whereby the ethyl and acetyl groups are split off I designate broadly as a saponifying treatment without intending thereby to limit myself to any specific technical meaning of this expression. In practice I find saponification by means of an acid to be ordinarily most desirable, although it is possible to use an alkali such as caustic soda to effect part of the saponification, that is, to split off the acetyl group. Where acid saponification is employed, which is preferred in actual practice, an acid compound of methylparaminophenol results. If sulfuric acid has been employed as the saponifying agent, the resulting product is the one specifically sought as a principal object of the invention, that is, methylparaminophenol sulfate. As will hereinafter appear however, the use of some other acid, such as hydrobromic or hydrochloric acid, offers distinct practical advantages in effecting the saponification, conversion of the resultant compound of methylparaminophenol with the saponifying acid into the sulfate being readily effected by treatment with an alkali or an alkaline substance, followed by acidification with sulfuric acid and appropriate separation of the desired final product.

In a typical procedure within the scope of the invention, a mixture of methyl phenacetin with an amount of concentrated hydrobromic acid (say 46% HBr.) equal to say 5 to 10 per cent in excess of two mols, is heated to boiling at ordinary atmospheric pressure, the operation being conducted in a suitable vessel provided with a descending condenser. I have found that good results can be obtained by bringing the liquid mixture quite rapidly up to about 110° C., and then slowly increasing the temperature to say 120° to 140° C., the whole heating operation most desirably taking say four to six hours, for example, and care being taken not to overheat. Most desirably the hydrobromic acid should be as pure as possible, and in particular should contain no free bromin. When no more ethyl bromid distils over, the reaction may be considered complete, and the residual methyl paraminophenol hydrobromid may be substantially freed of remaining acetic and hydrobromic acids by steam distillation. The saponifying reaction may be represented thus:

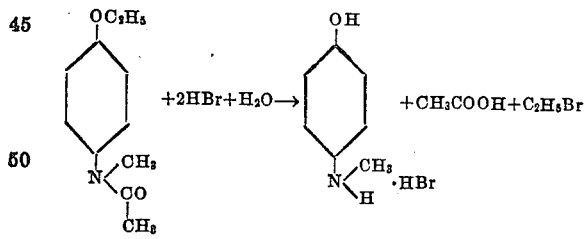

The hydrobromic acid compound of methyparaminophenol thus obtained may be converted into the sulfuric acid compound or sulfate after setting free the base with an alkali hydroxid or carbonate in the following manner. Addition of a concentrated solution of sodium carbonate or bicarbonate, for example, to the hydrobromic acid compound of the base sets the base free in crystalline form, and it can be readily separated from the accompanying aqueous solution of sodium bromid by filteration. I have found that the solution of sodium carbonate should most desirably be a warm concentrated solution and that it should be added quite rapidly to the hydrobromic acid compound of the base since this results in the formation of large bubbles of carbonic acid which break easily, whereas if the sodium carbonate or bicarbonate solution be added too slowly, the bubbles are much finer and cause troublesome foaming of the mixture. The generated carbonic acid aids in protecting the base from oxidation. To the separated free base is now added slightly more than the molecularly equivalent quantity of dilute sulfuric acid. This gives a brownish yellow solution of methyparaminophenol sulfate from which the desired final product can be obtained in a high degree of purity by the following method: To the brownish yellow solution is added a decolorizing carbon or char of any suitable kind, and the mixture is boiled for some time. A small amount of sodium bisulfite in the form of a 10 per cent aqueous solution, for example, is then added as a protective agent against oxidation. Other water soluble reducing agents may be employed. In practice I find that an addition of sodium bisulfite in the proportion of two ounces or somewhat less for each 35 pounds of methylparaminophenol sulfate present, gives excellent results and is especially desirable. This amount of sodium bisulfite is of course much less than is molecularly equivalent to the base. For the sake of a definition, an addition of reducing agent amounting to say 5 per cent by weight of the methylparaminophenol sulfate present may be mentioned as an upper limit for what may be considered a small amount of a water soluble reducing agent, or an amount substantially less than is chemically equivalent to the base. The hot mixture is filtered, and the filtrate is allowed to cool, most desirably in a protective atmosphere of carbon dioxid or other inert gas, whereupon crystals of paraminophenol sulfate separate. If, as is sometimes the case, this first crop of crystals is not sufficiently pure, the mother liquor is removed from them by decantation or otherwise and enough water is added to them to form a saturated solution thereof at 70° C. A further amount of fresh decolorizing black or char is added to this saturated solution which is then boiled as before to effect further purification; and after the addition of a second portion of sodium bisulfite in about the proportions before specified, the mixture is again filtered and cooled in an atmosphere of carbon dioxid, and practically pure methylparaminophenol sulfate is crystallized out. The mother liquor is first decanted on the filter and the crystals are then thrown on the filter and drained substantially free of the mother liquor. They are then washed on the filter first with cold water and then with methyl or ethyl alcohol, these being typical suitable volatile washing liquids which are miscible with water but which do not dissolve methylparaminophenol to a subtantial extent.

The purified crystals of methylparaminophenol sulfate are then substantially freed from all still adhering alcohol by a special method which I have found particularly desirable to follow. It would appear that removal of all the alcohol from the crystals without undesirably affecting them could be readily and most desirably accomplished by drying at low temperature and under diminished pressure. I have found, however, that, contary to what might be expected, this method of treating the crystals after removal from the filter is objectionable because the final product is invariably more or less blackened or darkened in color wherever it comes in contact with the containing vessel or holder. Just why this is I have so far been unable to determine; but I have found that the difficulty may be avoided by first thoroughly centrifuging the crystals after removal from the filter, thus mechanically freeing them of most of the alcohol which still remains; and then drying the centrifuged crystals at moderate temperatures and at ordinary atmospheric pressure. The final drying may or may not be expedited by exposing the crystals to currents of warm dry carbon dioxid or other inert non-oxidizing gas; but satisfactory results can be obtained by merely allowing spontaneous evaporation of the remaining slight traces of alcohol at room temperatures or at slightly higher temperatures, without special precautions as to maintenance of a non-oxidizing atmosphere in contact with the crystals. This two-stage method of freeing the crop of purified crystals from alcohol I consider to be an important part of the invention in its most desirable embodiment.

Methylparaminophenol sulfate produced in the manner described is of remarkably high purity and stability. It is practically pure white in color and exhibits no tendency to darken even after long periods of exposure to both air and light. Its high degree of purity and stability distinguish it from any other product heretofore known as methylparaminophenol sulfate, of which I am aware, as does also its greater efficiency in developer baths.

The method hereinbefore described in detail may be varied in certain respects without departing from the scope of the invention. For instance, the saponification of the methyl phenacetin may be accomplished by heating with concentrated hydriodic acid, or by heating under pressure with concentrated hydrochloric acid. According to still another procedure within the broad inventions, it is possible to treat methyl phenacetin with dilute sulfuric acid to split off the ethyl and acetyl groups and produce methylparaminaphenol sulfate directly. This method is difficult to carry out successfully in practice, however, the tendency being for the desired final product to form sulfonated compounds.

It is also possible to effect the saponification or splitting off of the ethyl and acetyl groups in two stages instead of doing this in one stage as has been described. Under some circumstances, the two-stage method of operation has advantages, particularly because it enables the by-products, acetic acid and ethyl bromid in this instance, to be separately collected and recovered for utilization; whereas in the one-stage saponification, these by-products distil off together and require special treatment for separation. In operating in two stages, it is most desirable to use an excess of hydrochloric acid under normal pressure as the saponifying agent in the first stage, whereby the acetyl group is split off in accordance with the following reaction:

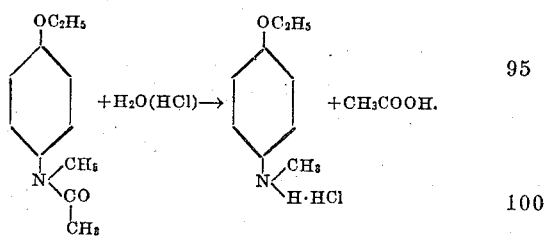

By distillation, the acetic acid may be readily recovered, and methyl phenetidin hydrochlorid obtained in substantially pure condition. In the second stage, the methyl phenetidin hydrochlorid obtained as described is best slowly heated with an excess of concentrated hydrobromic acid (or concentrated hydriodic acid) with formation of the hydrobromic (or hydriodic) acid compound of methylparaminophenol, and ethyl bromid (or iodid) which latter distils off with hydrochloric acid and the excess of hydrobromic acid. The reaction, using hydrobromic acid, can be represented as follows:

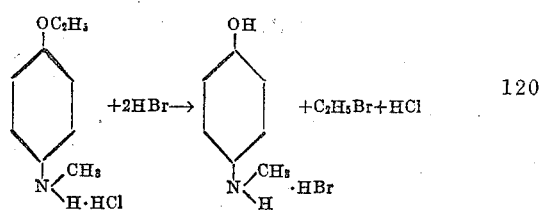

Instead of directly treating the hydrochloric acid compound of methyl phenetidin with hydrobromic acid, said compound may first be treated with sodium carbonate or other suitable alkaline agent to set free methyl phenetidin, which can then be treated with hydrobromic acid.

This application is in part a continuation of my prior copending application Serial No. 252,722, filed September 5, 1918.

What I claim is:

1. The process of preparing compounds comprising methylparaminophenol which comprises subjecting methyl phenacetin to a saponifying treatment, whereby the acetyl and ethyl groups are split off.

2. The process of preparing compounds comprising methylparaminophenol which comprises subjecting methyl phenacetin to a saponifying treatment with a mineral acid, whereby the acetyl and ethyl groups are split off.

3. The process of preparing compounds comprising methylparaminophenol which comprises subjecting methyl phenacetin to a saponifying treatment including treatment with concentrated hydrobromic acid, and converting the resultant hydrobromic acid compound of methylparaminophenol into the sulfuric acid compound thereof.

4. The process of preparing compounds comprising methylparaminophenol which comprises heating methyl phenacetin with a mineral acid under relatively mild and saponifying conditions such that only the acetyl group is split off, heating the resultant product comprising methyl phenetidin with a mineral acid under more drastic saponifying conditions such that the ethyl group is split off, separately collecting the by-products of the two heating treatments, and obtaining a mineral acid compound of methylparaminophenol formed in the second heating treatment.

5. The process of preparing compounds comprising methylparaminophenol which comprises heating methyl phenacetin with hydrochloric acid substantially at ordinary pressure and distilling off resultant acetic acid, heating the obtained hydrochlorid of methyl phenetidin with concentrated hydrobromic acid and distilling off resultant ethyl bromid, and converting the obtained hydrobromic acid compound of methylparaminophenol into the sulfuric acid compound thereof by successive treatment with an alkaline agent and sulfuric acid.

6. The process of preparing compounds comprising methylparaminophenol, which comprises subjecting a compound having the type formula

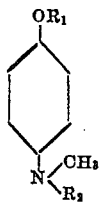

(where $R_1$ is an alkyl group and $R_2$ is an acidyl group) to a saponification treatment whereby the $R_1$ and $R_2$ groups are split off.

7. In the purification of methylparaminophenol sulfate, the method which comprises washing crystals of methylparaminophenol sulfate with an alcohol, centrifuging the washed crystals to free them of most of the adherent alcohol, and allowing the remaining adherent alcohol to evaporate from the crystals.

8. In the purification of solid compounds of the paraminophenol type, the method which comprises subjecting such a compound to contact with a volatile purifying liquid miscible with water, centrifuging said compound to free it of most of the adherent purifying liquid, and allowing the remaining adherent liquid to evaporate.

9. In the preparation of methylparaminophenol sulfate, the method comprises subjecting impure methylparaminophenol sulfate exposed to oxidizing influences to a purifying treatment while admixed with a small amount of a water soluble reducing agent.

10. In the preparation of methylparaminophenol sulfate, the method which comprises subjecting impure methylparaminophenol sulfate exposed to oxidizing influences to a purifying treatment while admixed with less than one per cent of sodium bisulfite.

11. In the preparation of easily oxidized derivatives of compounds of the paraminophenol type, the method which comprises subjecting such a derivative exposed to oxidizing inffluences to a purifying treatment while admixed with an amount of a bisulfite substantially less than is chemically equivalent thereto.

In testimony whereof I hereunto affix my signature.

EUGENE THEIMER.